United States Patent
Su et al.

(10) Patent No.: US 12,524,089 B2
(45) Date of Patent: Jan. 13, 2026

(54) METHOD AND SYSTEM FOR OPERATING SOFTWARE PROGRAM THROUGH MOVEMENT TRAJECTORIES AND AI ALGORITHMS

(71) Applicant: Primax Electronics Ltd., Taipei (TW)

(72) Inventors: Chun-Nan Su, Taipei (TW); Yun-Jung Lin, Taipei (TW); Ying-Che Tseng, Taipei (TW); Che-Yen Huang, Taipei (TW); Shi-Jie Zhang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/790,386

(22) Filed: Jul. 31, 2024

(65) Prior Publication Data

US 2025/0335045 A1    Oct. 30, 2025

(30) Foreign Application Priority Data

Apr. 30, 2024 (TW) ................. 113116218

(51) Int. Cl.

| | | |
|---|---|---|
| G06F 3/038 | (2013.01) |
| G06F 3/0354 | (2013.01) |
| G06F 3/0362 | (2013.01) |
| G06F 3/041 | (2006.01) |
| G06F 3/0488 | (2022.01) |
| G06F 9/451 | (2018.01) |

(52) U.S. Cl.
CPC .......... *G06F 3/038* (2013.01); *G06F 3/03543* (2013.01); *G06F 3/0362* (2013.01); *G06F 3/0488* (2013.01); *G06F 9/451* (2018.02); *G06F 3/0416* (2013.01)

(58) Field of Classification Search
CPC .... G06F 3/038; G06F 3/03543; G06F 3/0362; G06F 3/0488; G06F 3/0416; G06F 9/451
See application file for complete search history.

(56) References Cited

U.S. PATENT DOCUMENTS

| | | | |
|---|---|---|---|
| 10,353,579 B1 * | 7/2019 | Singer .................... | G06F 3/0484 |
| 10,564,759 B2 * | 2/2020 | Lee ....................... | G06F 3/04883 |
| 11,093,041 B2 * | 8/2021 | Bender ................. | G06F 3/0346 |
| 11,500,476 B1 * | 11/2022 | Chen ...................... | G08B 21/02 |
| 2005/0060658 A1 * | 3/2005 | Tsukiori ................. | G06F 3/038 |
| | | | 715/765 |

(Continued)

*Primary Examiner* — Ariel A Balaoing
(74) *Attorney, Agent, or Firm* — KIRTON McCONKIE; Evan R. Witt

(57) ABSTRACT

A method for operating a software program through movement trajectories and an AI algorithm is provided. The method is applied to a main control device and a peripheral input device. When at least one start key is triggered, a movement trajectory recording mode is started. Then, a real-time movement trajectory that is formed during an operation of the peripheral input device is recorded. When at least one end key is triggered or the operation of the peripheral input device is stopped, the movement trajectory recording mode is ended. The real-time movement trajectory at least contains a trajectory start point and a trajectory end point. Then, a movement trajectory identification process is performed on the real-time movement trajectory according to the AI algorithm, and an application program corresponding to the real-time movement trajectory is operated.

26 Claims, 5 Drawing Sheets

(56) References Cited

U.S. PATENT DOCUMENTS

| | | | | |
|---|---|---|---|---|
| 2006/0267967 A1* | 11/2006 | Hinckley | ............ | G06F 3/04883 345/179 |
| 2011/0187497 A1* | 8/2011 | Chin | ................... | G06F 3/04883 726/6 |
| 2012/0007713 A1* | 1/2012 | Nasiri | ................... | G06F 3/0233 455/574 |
| 2012/0092286 A1* | 4/2012 | O'Prey | ................ | G06F 3/0416 345/174 |
| 2013/0021262 A1* | 1/2013 | Chen | ..................... | G06F 1/1647 345/173 |
| 2013/0127719 A1* | 5/2013 | Yasutake | ............ | G06F 3/03543 345/163 |
| 2014/0033136 A1* | 1/2014 | St. Clair | ............ | G06F 3/04847 715/863 |
| 2020/0026910 A1* | 1/2020 | Wang | ..................... | G06N 3/084 |
| 2020/0050342 A1* | 2/2020 | Lee | ..................... | G06F 3/04815 |

\* cited by examiner

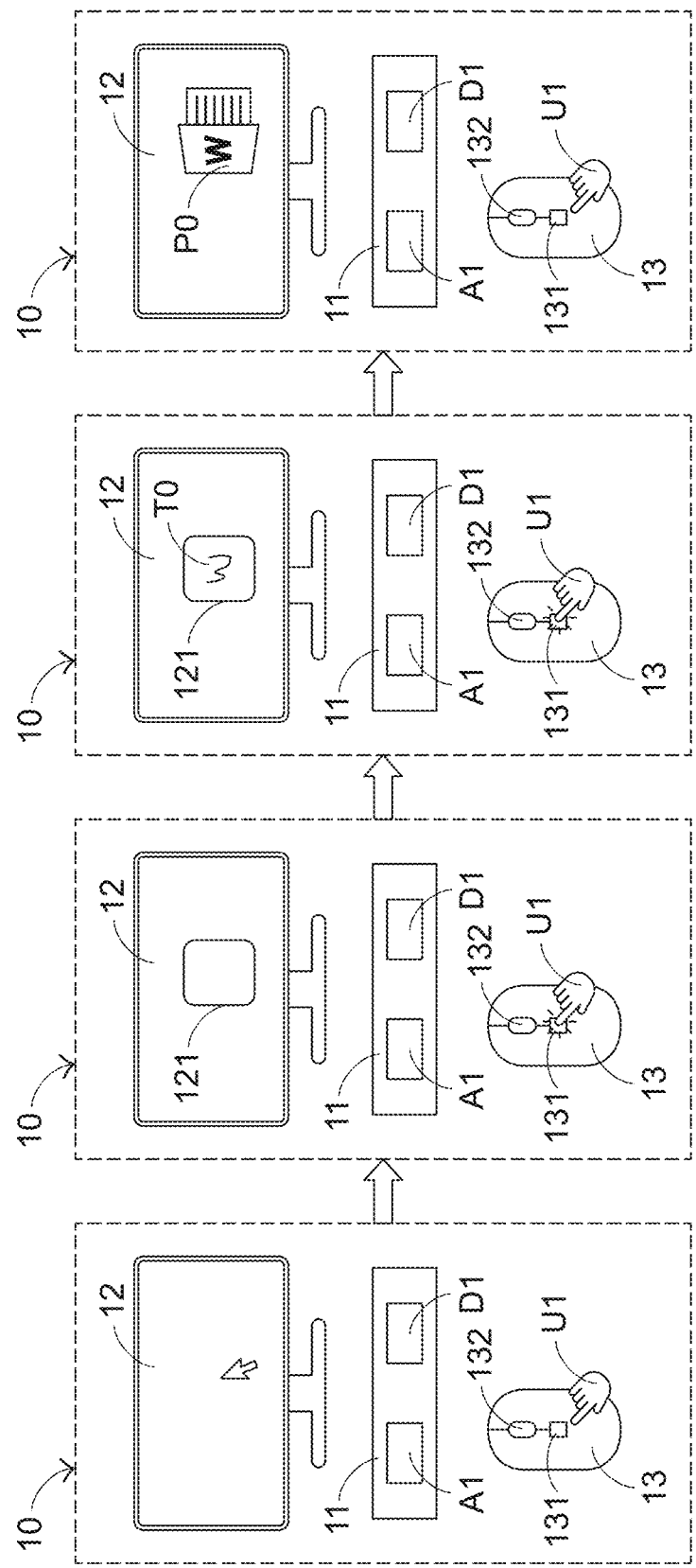

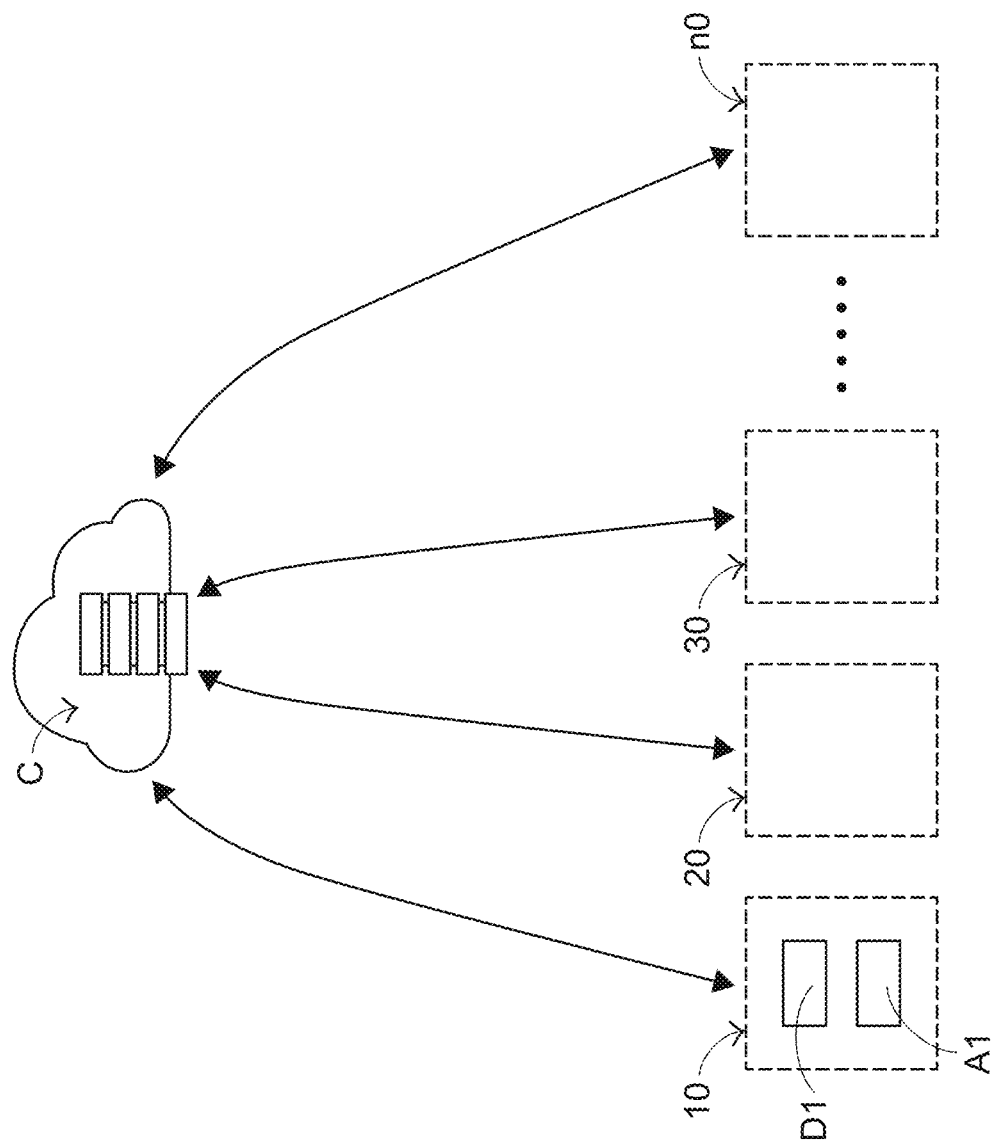

METHOD AND SYSTEM FOR OPERATING SOFTWARE PROGRAM THROUGH MOVEMENT TRAJECTORIES AND AI ALGORITHMS

FIELD OF THE INVENTION

The present invention relates to a method and a system for operating a software program, and more particularly to a method and a system for operating a software program through movement trajectories and AI algorithms.

BACKGROUND OF THE INVENTION

With the development of the Internet, a variety of application programs (app) are installed in many electronic products (e.g., computers or mobile phones) to provide necessary software services to users.

Generally, when a user wants to launch a specified application program (app), he (or she) needs to search the required application program on the home screen of the computer system or mobile phone system or in the "Start Menu" of the corresponding operating system. However, since the icons corresponding to a great number of application programs are arranged closely, the user cannot find the desired application program to use intuitively or quickly in the first place.

Furthermore, although the user can use the default shortcut keys of the peripheral input device (e.g., a keyboard) to quickly launch the desired application programs, the user's eyes usually need to focus on the positions of the shortcut keys on the keyboard, and the user's head and eyes also need to rotate and gaze in coordination. In other words, the way of accurately completing the above actions of launching the application program is troublesome.

Although the general computer system or mobile phone system allow the user to edit and define the required default shortcut keys in a specified programmable manner, the functions of programming the default shortcut keys are usually limited by the number of physical keys. In other words, this method does not have the expansion flexibility to a great extent.

As mentioned above, the user is unable to quickly or conveniently launch the required application program (app) according to the existing technologies. Similarly, the above problem exists when other types of software programs (e.g., system programs or internet services) are executed. For example, when the user wants to execute a corresponding system software function (e.g., the "Print Screen" function of capturing static screenshots or dynamic videos) through the combination key of two or more keys or execute a hyperlink (URL) of a website or webpage, the conventional operating method is not user-friendly because it cannot be operated quickly or conveniently.

SUMMARY OF THE INVENTION

An object of the present invention provides a method and a system for operating software programs through movement trajectories and AI algorithms. In accordance with the method and the system of the present invention, users can intuitively and quickly operate the software programs (e.g., application programs, system programs or network services) they want to use.

Another object of the present invention provides a method and a system for operating software programs through movement trajectories and AI algorithms. In accordance with the method and the system of the present invention, users can edit, define and set various types of preset shortcut keys by themselves without being limited by the specified number of keys.

In accordance with an aspect of the present invention, a method for operating a software program through movement trajectories and an AI algorithm is provided. The method is applied to an electronic system with a main control device and a peripheral input device. The peripheral input device is in communication with the main control device. The method at least includes the following steps. Firstly, a step (a) is performed to judge whether at least one start key is triggered. If the at least one start key is triggered, a step (b) of starting a movement trajectory recording mode is performed. In a step (c), a real-time movement trajectory that is formed during an operation of the peripheral input device is recorded. In a step (d), the movement trajectory recording mode is ended when at least one end key is triggered or the operation of the peripheral input device is stopped, wherein the real-time movement trajectory at least contains a trajectory start point and a trajectory end point. In a step (e), a movement trajectory identification process is performed on the real-time movement trajectory according to the AI algorithm and executing an application program corresponding to the real-time movement trajectory.

In an embodiment, the main control device includes a display screen that displays the real-time movement trajectory, and the main control device performs the movement trajectory identification process on the real-time movement trajectory according to the AI algorithm.

Preferably, in the step (b) of starting the movement trajectory recording mode, a movement trajectory operation area is displayed on the display screen, and the real-time movement trajectory is displayed on the movement trajectory operation area. In the step (d) of ending the movement trajectory recording mode, the movement trajectory operation area is not displayed on the display screen.

In an embodiment, the peripheral input device is a touch pad or a mouse, or the peripheral input device and the display screen are integrated as a touch screen with a touch input function.

Preferably, in the step (c), a trajectory information storage space in the main control device stores the real-time movement trajectory, and the storage space capacity required for the real-time movement trajectory is dynamically configured and adjusted according to an actual size of the real-time movement trajectory.

In an embodiment, after an original trajectory image information corresponding to the real-time movement trajectory stored in the trajectory information storage space is subjected to a feature extraction process, a trajectory image feature information about a smaller number of images is formed.

Preferably, in the step (d) of ending the movement trajectory recording mode, the real-time movement trajectory recorded in the main control device further contains a real-time movement trajectory direction information and a real-time movement trajectory sequence information.

Preferably, in the step (e), the AI algorithm is installed in at least one of the main control device and a cloud server.

In an embodiment, the AI algorithm includes a neural network algorithm, and the neural network algorithm at least includes a recurrent neural networks (RNN) algorithm or a convolutional neural network (CNN) algorithm.

Preferably, the step (e) of performing the movement trajectory identification process is carried out after the step (d) of ending the movement trajectory recording mode, or the step (e) of performing the movement trajectory identification process and the step (c) of forming the real-time movement trajectory during the operation of the peripheral input device are performed simultaneously.

In an embodiment, the step (e) of performing the movement trajectory identification process includes the following steps. Firstly, a step (e1) is performed to judge whether the real-time movement trajectory complies with a specified preset movement trajectory in a preset movement trajectory database according to the AI algorithm. If a judging condition of the step (e1) is satisfied, a step (e2) is performed to operate a program software corresponding to the specified preset movement trajectory.

In an embodiment, the step (e) of performing the movement trajectory identification process further includes the following steps. If a judging condition of the step (e1) is not satisfied, a step (e3) is performed. In the step (e3), a trajectory learning process is performed on the AI algorithm, and an additional preset movement trajectory is generated through a correcting and filtering process. In a step (e4), the additional preset movement trajectory is stored in the preset movement trajectory database, and then the step (e1) is performed again.

In an embodiment, after the step (e2), the method further includes the following steps. Firstly, a step (f) is performed to judge whether the program software operated in the step (e2) complies with a preset program software. If a judging condition of the step (f) is not satisfied, the step (e3) and the step (e4) are performed again. If the judging condition of the step (f) is satisfied, the step (a) is performed again.

In an embodiment, the at least one start key and the at least one end key are installed on one of the main control device and the peripheral input device, or the at least one start key is installed on one of the main control device and the peripheral input device and the at least one end key is installed on the other of the main control device and the peripheral input device.

In an embodiment, each of the at least one start key and the at least one end key is a non-touch single key, a non-touch composite key, a touch single key or a touch composite key.

In an embodiment, each of the at least one start key and the at least one end key is triggered through a pressing action, a scrolling action or a touch action.

In accordance with another aspect of the present invention, an electronic system for operating a software program through movement trajectories and an AI algorithm is provided. The electronic system includes a main control device and a peripheral input device. The main control device includes a display screen. The main control device works in conjunction with the AI algorithm. The peripheral input device is in communication with the main control device. At least one start key is installed on one of the main control device and the peripheral input device. A movement trajectory recording mode is started when the at least one start key is triggered. During an operation of the peripheral input device, a real-time movement trajectory is displayed on the display screen. After the main control device performs a movement trajectory identification process on the real-time movement trajectory according to the AI algorithm, an application program corresponding to the real-time movement trajectory is launched.

In an embodiment, the electronic system is a computer system, and the main control device is a computer host, wherein the real-time movement trajectory is recorded in the computer host, the display screen is in communication with the computer host, and the real-time movement trajectory is displayed on the display screen.

In an embodiment, the peripheral input device is a touch pad or a mouse.

In an embodiment, the electronic system is a mobile phone system, and the main control device is a mobile phone body. The real-time movement trajectory is recorded in the mobile phone body. The peripheral input device and the display screen are integrated as a touch screen with a touch input function. The display screen is provided in the mobile phone body to display the real-time movement trajectory.

In an embodiment, the touch screen with the touch input function has the at least one start key that is triggered to start the movement trajectory recording mode. When the touch screen with the touch input function is operated, the real-time movement trajectory is displayed on the touch screen with the touch input function.

In an embodiment, a trajectory information storage space in the main control device stores the real-time movement trajectory, and the storage space capacity required for the real-time movement trajectory is dynamically configured and adjusted according to an actual size of the real-time movement trajectory.

In an embodiment, after an original trajectory image information corresponding to the real-time movement trajectory stored in the trajectory information storage space is subjected to a feature extraction process, a trajectory image feature information about a smaller number of images is formed.

In an embodiment, the real-time movement trajectory at least contains a trajectory start point, a trajectory end point, a real-time movement trajectory direction information and a real-time movement trajectory sequence information.

In an embodiment, the AI algorithm is installed in at least one of the main control device and a cloud server.

In an embodiment, the AI algorithm includes a neural network algorithm, and the neural network algorithm at least includes a recurrent neural networks (RNN) algorithm or a convolutional neural network (CNN) algorithm.

In an embodiment, the movement trajectory identification process at least includes the following steps. Firstly, a step (a) is performed to judge whether the real-time movement trajectory complies with a specified preset movement trajectory in a preset movement trajectory database according to the AI algorithm. If a judging condition of the step (a) is satisfied, a program software corresponding to the specified preset movement trajectory is operated.

In an embodiment, the electronic system further includes at least one end key, and the at least one end key is installed on one of the main control device and the peripheral input device, wherein the movement trajectory recording mode is ended when the at least one end key is triggered.

In an embodiment, each of the at least one start key and the at least one end key is triggered through a pressing action, a scrolling action or a touch action.

In an embodiment, each of the at least one start key and the at least one end key is a non-touch single key, a non-touch composite key, a touch single key or a touch composite key.

The above objects and advantages of the present invention will become more readily apparent to those ordinarily skilled in the art after reviewing the following detailed description and accompanying drawings, in which:

BRIEF DESCRIPTION OF THE DRAWINGS

FIGS. 1A to 1D schematically illustrate the operations of an electronic system for operating a software program through movement trajectories and AI algorithms;

FIG. 3 schematically illustrates the architecture of a multi-user system with a cloud server and plural electronic systems.

DETAILED DESCRIPTION OF THE PREFERRED EMBODIMENT

Figure 2A:
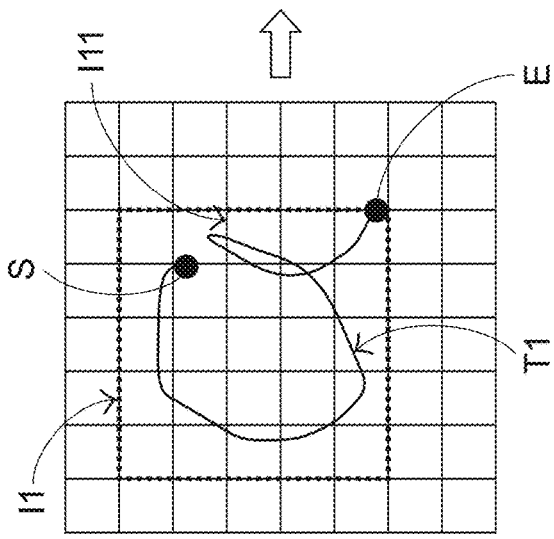
FIG. 2A schematically illustrates the dynamic configuration relationship between a real-time movement trajectory and a trajectory information storage space for storing and recording the real-time movement trajectory.

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

FIGS. 1A to 1D schematically illustrate the operations of an electronic system for operating a software program through movement trajectories and AI algorithms.

As shown in FIG. 1A, the architecture of the electronic system 10 at least includes a main control device 11 and a peripheral input device 13. The main control device 11 includes a display screen 12. The peripheral input device 13 is in communication with the main control device 11. The main control device 11 works in conjunction with an AI algorithm A1 and a preset movement trajectory database D1.

In an embodiment, the electronic system 10 is a computer system, and the main control device 11 is a computer host. Preferably but not exclusively, the AI algorithm A1 and the preset movement trajectory database D1 are installed in the main control device 11.

Preferably but not exclusively, the AI algorithm A1 used in the electronic system 10 at least includes a neural network algorithm such as a recurrent neural networks (RNN) algorithm or a convolutional neural network (CNN) algorithm.

The peripheral input device 13 is in communication with the main control device 11 in a wired transmission manner or a wireless transmission manner. The peripheral input device 13 is a touch pad or a mouse. For illustration, the peripheral input device 13 is a mouse in the following embodiment.

In an embodiment, at least one of the main control device 11 and the peripheral input device 13 is selectively equipped with at least one start key. A movement trajectory recording mode can be started through the start key. Furthermore, at least one of the main control device 11 and the peripheral input device 13 is selectively equipped with at least one end key. The movement trajectory recording mode can be ended through the end key.

In an embodiment, the at least one start key and the at least one end key are combined as a single key on the peripheral input device 13. For example, the peripheral input device 13 includes various keys, including an AI trajectory recording start key 131 and a mouse wheel key 132. When the AI trajectory recording start key 131 is pressed by a user U1, the movement trajectory recording mode is started. When the AI trajectory recording start key 131 is released by a user U1, the movement trajectory recording mode is ended. It is noted that numerous modifications and alterations may be made while retaining the teachings of the invention.

In another embodiment (not shown), the mouse wheel key 132 is related to the movement trajectory recording mode. When the mouse wheel key 132 is scrolled upwardly, the movement trajectory recording mode is started. When the mouse wheel key 132 is scrolled downwardly, the movement trajectory recording mode is ended.

In an embodiment, each of the at least one start key and the at least one end key is a non-touch single key (e.g., a mechanical single key) or a non-touch composite key (e.g., a composite key composed of at least two keys).

Please refer to FIG. 1B. After the AI trajectory recording start key 131 is pressed by the user U1 and the movement trajectory recording mode is started, a movement trajectory operation area 121 is displayed on the display screen 12.

Please refer to FIG. 1C. The peripheral input device 13 is continuously slid by the user U1 in multiple directions while the AI trajectory recording start key 131 is pressed and held by the user U1. Correspondingly, a real-time movement trajectory T0 is displayed on the movement trajectory operation area 121 of the display screen 12. The real-time movement trajectory T0 (e.g., a handwriting trajectory of the English letter "W" shown in FIG. 1C) is recorded in the main control device 11.

Please refer to FIG. 1D. After the AI trajectory recording start key 131 is released by the user U1 and the movement trajectory recording mode is ended, the main control device 11 performs a movement trajectory identification process on the real-time movement trajectory T0 according to the AI algorithm A1. Consequently, an application program P0 corresponding to the real-time movement trajectory T0 (e.g., a Microsoft WORD software) is launched.

The movement trajectory identification process at least includes the following steps. Firstly, the AI algorithm A1 is used to judge whether the real-time movement trajectory T0 complies with a preset movement trajectory in the preset movement trajectory database D1. If the judging result indicates that the real-time movement trajectory T0 complies with the preset movement trajectory, the application program P0 corresponding to the real-time movement trajectory T0 is launched.

It is noted that numerous modifications and alterations may be made while retaining the teachings of the invention. For example, the function of the at least one end key may be implemented through another control strategy. In another embodiment, the movement trajectory recording mode is ended when the peripheral input device 13 is not longer slid. Alternatively, the movement trajectory recording mode is ended after the peripheral input device 13 has not been operated for a certain time period.

In FIG. 1D, the procedure of launching the application program P0 corresponding to the real-time movement trajectory T0 (e.g., a Microsoft WORD software) is taken as an example. The concepts of the present invention can be applied to other types of software programs (e.g., system programs or internet services). For example, when the user wants to execute a corresponding system software function (e.g., the "Print Screen" function of capturing static screenshots or dynamic videos) through the combination key of two or more keys or execute a hyperlink (URL) of a website or webpage, the concepts of the present invention are feasible.

In another embodiment, the electronic system is a mobile phone system (not shown). The main control device is a mobile phone body (not shown) for recording the real-time movement trajectory T0. The peripheral input device and the display screen are integrated as a touch screen (not shown) with a touch input function. The display screen is provided in the mobile phone body to display the real-time movement trajectory T0. The touch screen with the touch input function also includes at least one start key. The movement trajectory recording mode can be started through the start key. When the touch screen with the touch input function is operated, the real-time movement trajectory T0 is displayed on the touch screen with touch input function.

As mentioned above in FIG. 1C, the real-time movement trajectory T0 is recorded in the main control device 11. Hereinafter, the principles of storing and recording the real-time movement trajectory T0 in the main control device 11 and the principles of simply processing the image information of the real-time movement trajectory T0 will be illustrated with reference to FIGS. 2A to 2D.

FIG. 2A schematically illustrates the dynamic configuration relationship between a real-time movement trajectory T1 and a trajectory information storage space I1 for recording and storing the real-time movement trajectory T1.

For example, the real-time movement trajectory T1 is a handwriting trajectory of the English letter "a". The real-time movement trajectory T1 at least includes a trajectory start point S and a trajectory end point E. In this embodiment, the total number of grids is dynamically adjusted. That is, the total size of the array storage space is not a fixed value. After the storage space capacity required for the real-time movement trajectory T1 is dynamically configured and adjusted, the trajectory information storage space I1 is formed. Consequently, the grids (i.e., the array storage space) along the path from the trajectory start point S of the real-time movement trajectory T1 to the trajectory end point E of the real-time movement trajectory T1 are included in the final trajectory information storage space I1, which will be described later in FIG. 2C. Of course, in case that the overall appearance of the handwriting trajectory of the English letter "a" (i.e., the real-time movement trajectory T1) becomes larger or smaller than that shown in FIG. 2A, the storage space capacity required for the real-time movement trajectory T1 is dynamically configured and adjusted. That is, the storage space capacity of the trajectory information storage space I1 is simultaneously increased or decreased.

Figure 2B:
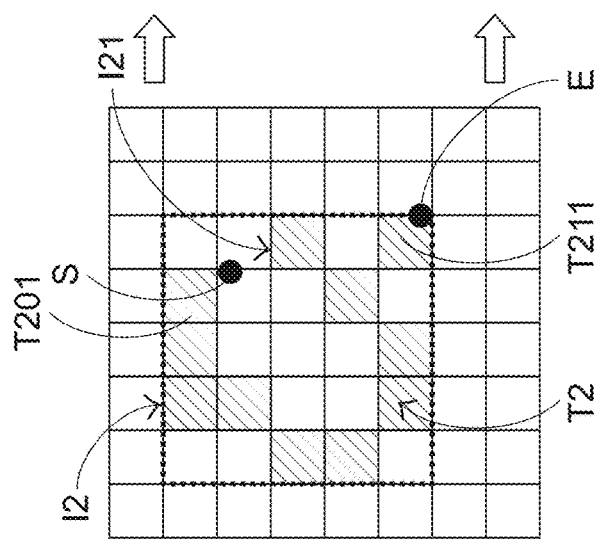
FIG. 2B schematically illustrates another real-time movement trajectory with a smaller number of images and a trajectory image feature information after the original trajectory image information corresponding to the real-time movement trajectory of FIG. 2A is subjected to a feature extraction process.

FIG. 2B schematically illustrates another real-time movement trajectory T2 with a smaller number of images and a trajectory image feature information after the original trajectory image information corresponding to the real-time movement trajectory T1 of FIG. 2A is subjected to a feature extraction process. As shown in FIG. 2A, each grid (i.e., the array storage space) I11 in the trajectory information storage space I1 containing the real-time movement trajectory T1 is represented by 10×10 original trajectory image pixels. After a feature extraction process is performed, each grid (i.e., the array storage space) I21 is represented by a 1×1 trajectory image pixel (e.g., a feature value). Consequently, another real-time movement trajectory T2 with a smaller number of images is defined, and the real-time movement trajectory T2 is completely stored in the trajectory information storage space I2.

As shown in FIG. 2B, the real-time movement trajectory T2 is composed of 11 grids T201~211 with marks. That is, the real-time movement trajectory T2 is composed of 11 array storage spaces, and each array storage space is represented by a 1×1 trajectory image pixel. In addition, the real-time movement trajectory T2 is included in the trajectory information storage space I2. In this way, the necessary trajectory image pixels related to the feature values of the trajectory path are retained, and the remaining trajectory image pixels are deleted. Consequently, the number of trajectory image pixels to be processed is largely reduced.

Figure 2C:
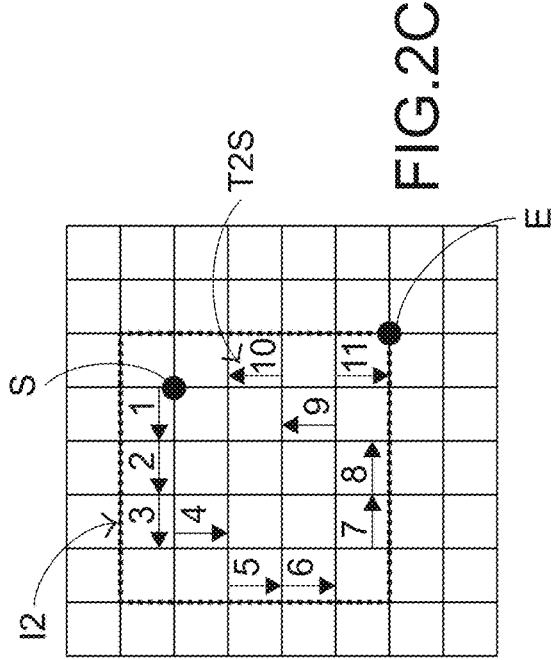
FIG. 2C schematically illustrates a real-time movement trajectory sequence information about the real-time movement trajectory shown in FIG. 2B.

FIG. 2C schematically illustrates a real-time movement trajectory sequence information T2S about the real-time movement trajectory T2 shown in FIG. 2B. In FIG. 2C, the 11 mark-filled grids (i.e., array storage spaces) T201~211 are sequentially numbered from 1 to 11 and defined as a real-time movement trajectory sequence information T2S.

Please refer to FIGS. 2A and 2C. Similarly, a process for dynamically configuring and adjusting the size of the spaces (array storage spaces) required for the real-time movement trajectory T1 will be described as follows. Firstly, the real-time movement trajectory T1 starts from the trajectory start point S and moves to the left. Meanwhile, the size of the space (i.e., the array storage space) dynamically configured and adjusted for the real-time movement trajectory T1 is

, i.e., a 1×1 grid. As the real-time movement trajectory T1 continuously moves to the left, the trajectory range is expanded. Consequently, the size of the space (i.e., the array storage space) dynamically configured and adjusted for the real-time movement trajectory T1 is changed to , i.e., 2×2 grids. The rest may be deduced by analogy. Afterwards, the trajectory information storage space I1 is formed.

Figure 2D:
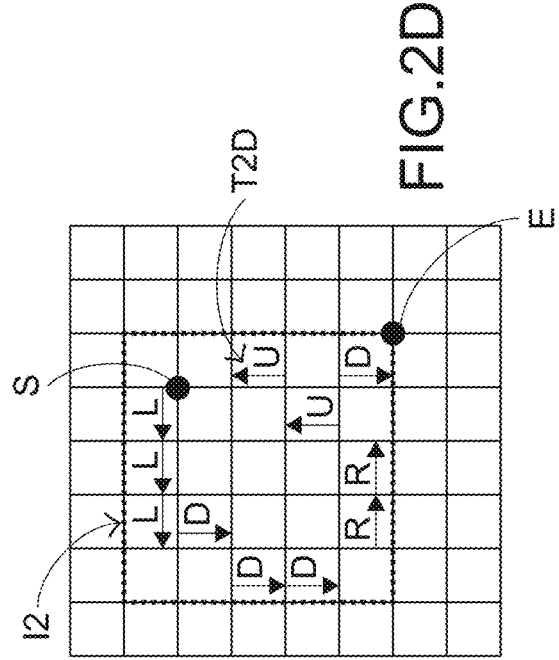
FIG. 2D schematically illustrates a real-time movement trajectory direction information about the real-time movement trajectory shown in FIG. 2B.

FIG. 2D schematically illustrates a real-time movement trajectory direction information T2D about the real-time movement trajectory T2 shown in FIG. 2B. In FIG. 2D, the directions of generating the 11 mark-filled grids (i.e., array storage spaces) T201~211 are sequentially defined as a real-time movement trajectory direction information T2D. That is, the real-time movement trajectory direction information T2D is a string set of at least one string including L (leftward string), D (downward string), R (rightward string) and U (Upward string). For example, in FIG. 2D, the string set corresponding to the real-time movement trajectory direction information T2D is: LLLDDDRRUUD After the real-time movement trajectory sequence information T2S shown in FIG. 2C and the real-time movement trajectory direction information T2D shown in FIG. 2D are obtained, the working time of performing the movement trajectory identification process is saved.

In the above embodiment, the electronic system is a single-user system. It is noted that the concepts of the present invention can be applied to a large system architecture with plural electronic systems. FIG. 3 schematically illustrates the architecture of a multi-user system with a cloud server and plural electronic systems. The multi-user system comprises a cloud server C and plural electronic systems 10, 20, 30, . . . , and n0. The AI algorithm A1 and the preset movement trajectory database D1 in the above electronic system 10 can be uploaded to the cloud server C for larger-scale data collection and in-depth learning and training. Alternatively, AI algorithm A1 and the preset movement trajectory database D1 can be downloaded from the cloud server C.

Figure 4A:
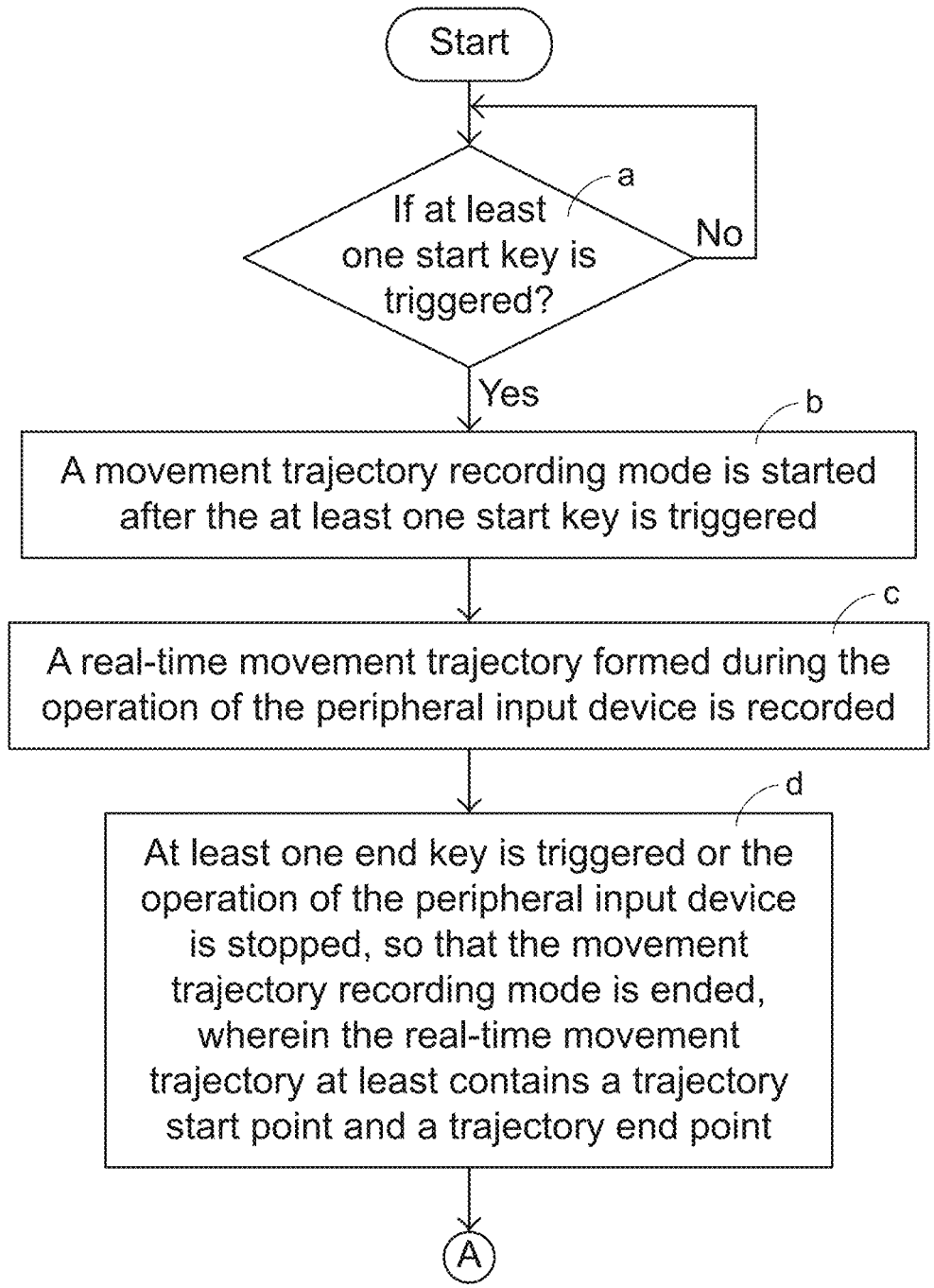
FIGS. 4A and 4B schematically illustrate a flowchart of a method for operating a software program through movement trajectories and AI algorithms according to an embodiment of the present invention.
Figure 4B:
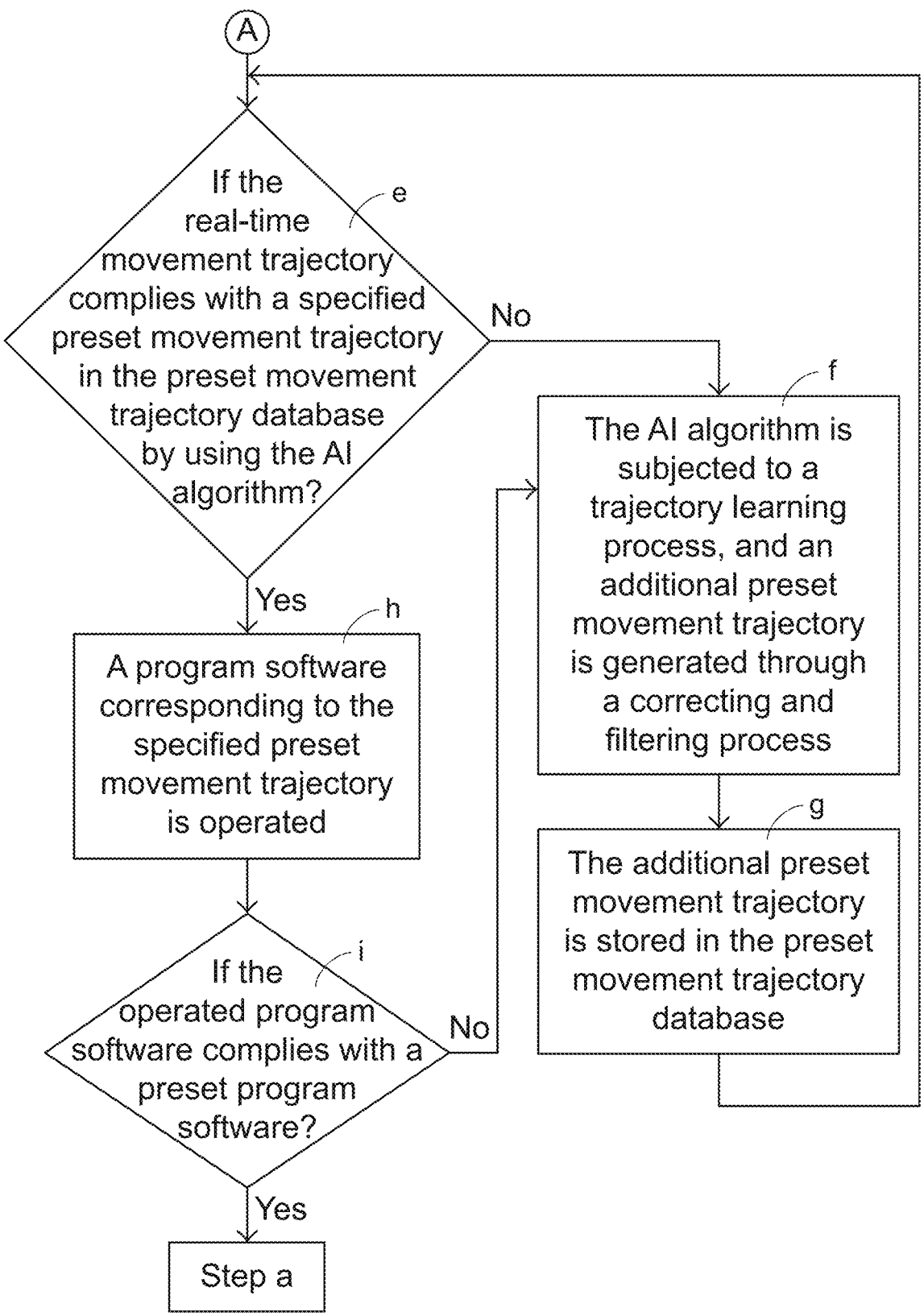

FIGS. 4A and 4B schematically illustrate a flowchart of a method for operating a software program through movement trajectories and AI algorithms according to an embodiment of the present invention. This method is applied to an electronic system with a main control device and a peripheral input device. This method at least includes the following steps.

Firstly, a step (a) is performed to judge whether at least one start key is triggered.

If the judging result of the step (a) indicates that the at least one start key is not triggered, the step (a) is repeatedly done.

If the judging result of the step (a) indicates that the at least one start key is triggered, a movement trajectory recording mode is started (Step (b)).

After the step (b), a real-time movement trajectory formed during the operation of the peripheral input device is recorded (Step (c)).

The main control device includes a display screen. The real-time movement trajectory is displayed on the display screen. The real-time movement trajectory is stored in the main control device.

Preferably, the peripheral input device is a touch pad or a mouse. Alternatively, the peripheral input device and the display screen are integrated as a touch screen with a touch input function.

In an embodiment of the step (c), a trajectory information storage space in the main control device is used for storing the real-time movement trajectory, and the storage space capacity required for the real-time movement trajectory is dynamically configured and adjusted according to the actual size of the real-time movement trajectory.

After an original trajectory image information corresponding to the real-time movement trajectory stored in the trajectory information storage space is subjected to a feature extraction process, a trajectory image feature information about a smaller number of images is formed.

After the step (c), a step (d) is performed. In the step (d), the at least one end key is triggered or the operation of peripheral input device is stopped, so that the movement trajectory recording mode is ended. The real-time movement trajectory at least contains a trajectory start point, a trajectory end point, a real-time movement trajectory direction information and a real-time movement trajectory sequence information.

Then, a step (e) is performed to judge whether the real-time movement trajectory complies with a specified preset movement trajectory in the preset movement trajectory database by using the AI algorithm.

The AI algorithm is installed in at least one of the main control device and a cloud server. The AI algorithm at least includes a neural network algorithm such as a recurrent neural networks (RNN) algorithm or a convolutional neural network (CNN) algorithm.

In an embodiment, the step (e) of performing the movement trajectory identification process is carried out after the step (d) of ending the movement trajectory recording mode. Alternatively, the step (e) of performing the movement trajectory identification process and the step (c) of forming the real-time movement trajectory during the operation of the peripheral input device are performed simultaneously.

If the judging result of the step (e) indicates that the real-time movement trajectory does not comply with the preset movement trajectory in the preset movement trajectory database, the AI algorithm is subjected to a trajectory learning process, and an additional preset movement trajectory is generated through a correcting and filtering process (Step (f)).

Then, in a step (g), the additional preset movement trajectory is stored in the preset movement trajectory database.

If the judging result of the step (e) indicates that the real-time movement trajectory complies with a specified preset movement trajectory in the preset movement trajectory database, a program software corresponding to the specified preset movement trajectory is operated (Step (h)).

After the step (h), a step (i) is performed to judge whether the operated program software complies with a preset program software.

If the judging result of the step (i) indicates that the operated program software does not comply with any preset program software, the step (f) and the step (g) are repeatedly done. Whereas, if the judging result of the step (i) indicates that the operated program software complies with the preset program software, the step (a) is performed again.

In an embodiment, the at least one start key and the at least one end key are installed on one of the main control device and the peripheral input device. In another embodiment, the at least one start key is installed on one of the main control device and the peripheral input device and the at least one end key is installed on the other of the main control device and the peripheral input device.

In an embodiment, each of the at least one start key and the at least one end key is a non-touch single key, a non-touch composite key, a touch single key or a touch composite key.

Moreover, each of the at least one start key and the at least one end key is triggered through a pressing action, a scrolling action or a touch action.

From the above descriptions, the present invention provides a method and a system for operating a software program through movement trajectories and AI algorithms. By the method and the system of the present invention, users can intuitively and quickly operate the software programs they want to use. In addition, the users can edit and define various movement trajectories and arbitrarily set various types of preset shortcut keys by themselves without being limited by the specified number of keys.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for operating a software program through movement trajectories and an AI algorithm, the method being applied to an electronic system with a main control device and a peripheral input device, the peripheral input device being in communication with the main control device, the method at least comprising steps of:
(a) judging whether at least one start key is triggered;
(b) if the at least one start key is triggered, starting a movement trajectory recording mode;
(c) recording a real-time movement trajectory that is formed during an operation of the peripheral input device;

(d) ending the movement trajectory recording mode when at least one end key is triggered or the operation of the peripheral input device is stopped, wherein the real-time movement trajectory at least contains a trajectory start point and a trajectory end point; and (e) performing a movement trajectory identification process on the real-time movement trajectory according to the AI algorithm and executing an application program corresponding to the real-time movement trajectory, comprising steps of:

(e1) judging whether the real-time movement trajectory complies with a specified preset movement trajectory in a preset movement trajectory database according to the AI algorithm;

(e2) if a judging condition of the step (e1) is satisfied, operating a program software corresponding to the specified preset movement trajectory (e3) if a judging condition of the step (e1) is not satisfied, performing a trajectory learning process on the AI algorithm, and generating an additional preset movement trajectory through a correcting and filtering process; and (e4) storing the additional preset movement trajectory in the preset movement trajectory database, and then performing the step (e1) again.

2. The method according to claim 1, wherein the main control device comprises a display screen that displays the real-time movement trajectory, and the main control device performs the movement trajectory identification process on the real-time movement trajectory according to the AI algorithm.

3. The method according to claim 2, wherein in the step (b) of starting the movement trajectory recording mode, a movement trajectory operation area is displayed on the display screen, and the real-time movement trajectory is displayed on the movement trajectory operation area, wherein in the step (d) of ending the movement trajectory recording mode, the movement trajectory operation area is not displayed on the display screen.

4. The method according to claim 2, wherein the peripheral input device is a touch pad or a mouse, or the peripheral input device and the display screen are integrated as a touch screen with a touch input function.

5. The method according to claim 2, wherein in the step (c), a trajectory information storage space in the main control device stores the real-time movement trajectory, and the storage space capacity required for the real-time movement trajectory is dynamically configured and adjusted according to an actual size of the real-time movement trajectory.

6. The method according to claim 5, wherein after an original trajectory image information corresponding to the real-time movement trajectory stored in the trajectory information storage space is subjected to a feature extraction process, a trajectory image feature information about a smaller number of images is formed.

7. The method according to claim 2, wherein in the step (d) of ending the movement trajectory recording mode, the real-time movement trajectory recorded in the main control device further contains a real-time movement trajectory direction information and a real-time movement trajectory sequence information.

8. The method according to claim 2, wherein in the step (e), the AI algorithm is installed in at least one of the main control device and a cloud server.

9. The method according to claim 8, wherein the AI algorithm comprises a neural network algorithm, and the neural network algorithm at least comprises a recurrent neural networks (RNN) algorithm or a convolutional neural network (CNN) algorithm.

10. The method according to claim 1, wherein the step (e) of performing the movement trajectory identification process is carried out after the step (d) of ending the movement trajectory recording mode, or the step (e) of performing the movement trajectory identification process and the step (c) of forming the real-time movement trajectory during the operation of the peripheral input device are performed simultaneously.

11. The method according to claim 1, wherein after the step (e2), the method further comprises steps of:

(f) judging whether the program software operated in the step (e2) complies with a preset program software;

(g) if a judging condition of the step (f) is not satisfied, performing the step (e3) and the step (e4) again; and (h) if the judging condition of the step (f) is satisfied, performing the step (a) again.

12. The method according to claim 1, wherein the at least one start key and the at least one end key are installed on one of the main control device and the peripheral input device, or the at least one start key is installed on one of the main control device and the peripheral input device and the at least one end key is installed on the other of the main control device and the peripheral input device.

13. The method according to claim 1, wherein each of the at least one start key and the at least one end key is a non-touch single key, a non-touch composite key, a touch single key or a touch composite key.

14. The method according to claim 1, wherein each of the at least one start key and the at least one end key is triggered through a pressing action, a scrolling action or a touch action.

15. An electronic system for operating a software program through movement trajectories and an AI algorithm, the electronic system comprising:

a main control device comprising a display screen, wherein the main control device works in conjunction with the AI algorithm; and a peripheral input device in communication with the main control device, wherein at least one start key is installed on one of the main control device and the peripheral input device, and a movement trajectory recording mode is started when the at least one start key is triggered, wherein during an operation of the peripheral input device, a real-time movement trajectory is displayed on the display screen, wherein after the main control device performs a movement trajectory identification process on the real-time movement trajectory according to the AI algorithm, an application program corresponding to the real-time movement trajectory is launched, wherein a trajectory information storage space in the main control device stores the real-time movement trajectory, and the storage space capacity required for the real-time movement trajectory is dynamically configured and adjusted according to an actual size of the real-time movement trajectory, wherein after an original trajectory image information corresponding to the real-time movement trajectory stored in the trajectory information storage space is subjected to a feature extraction process, a trajectory image feature information about a smaller number of images is formed.

16. The electronic system according to claim 15, wherein the electronic system is a computer system, the main control device is a computer host, the real-time movement trajectory is recorded in the computer host, the display screen is in communication with the computer host, and the real-time movement trajectory is displayed on the display screen.

17. The electronic system according to claim 16, wherein the peripheral input device is a touch pad or a mouse.

18. The electronic system according to claim 15, wherein the electronic system is a mobile phone system, and the main control device is a mobile phone body, wherein the real-time movement trajectory is recorded in the mobile phone body, the peripheral input device and the display screen are integrated as a touch screen with a touch input function, and the display screen is provided in the mobile phone body to display the real-time movement trajectory.

19. The electronic system according to claim 18, wherein the touch screen with the touch input function has the at least one start key that is triggered to start the movement trajectory recording mode, wherein when the touch screen with the touch input function is operated, the real-time movement trajectory is displayed on the touch screen with the touch input function.

20. The electronic system according to claim 15, wherein the real-time movement trajectory at least contains a trajectory start point, a trajectory end point, a real-time movement trajectory direction information and a real-time movement trajectory sequence information.

21. The electronic system according to claim 15, wherein the AI algorithm is installed in at least one of the main control device and a cloud server.

22. The electronic system according to claim 21, wherein the AI algorithm comprises a neural network algorithm, and the neural network algorithm at least comprises a recurrent neural networks (RNN) algorithm or a convolutional neural network (CNN) algorithm.

23. The electronic system according to claim 15, wherein the movement trajectory identification process at least comprises steps of:
(a) judging whether the real-time movement trajectory complies with a specified preset movement trajectory in a preset movement trajectory database according to the AI algorithm; and
(b) if a judging condition of the step (a) is satisfied, operating a program software corresponding to the specified preset movement trajectory.

24. The electronic system according to claim 15, wherein the electronic system further comprises at least one end key, and the at least one end key is installed on one of the main control device and the peripheral input device, wherein the movement trajectory recording mode is ended when the at least one end key is triggered.

25. The electronic system according to claim 24, wherein each of the at least one start key and the at least one end key is triggered through a pressing action, a scrolling action or a touch action.

26. The electronic system according to claim 24, wherein each of the at least one start key and the at least one end key is a non-touch single key, a non-touch composite key, a touch single key or a touch composite key.

* * * * *